J. W. Blodgett,
Stump Elevator.
Nº 55,809.     Patented June 26, 1866.
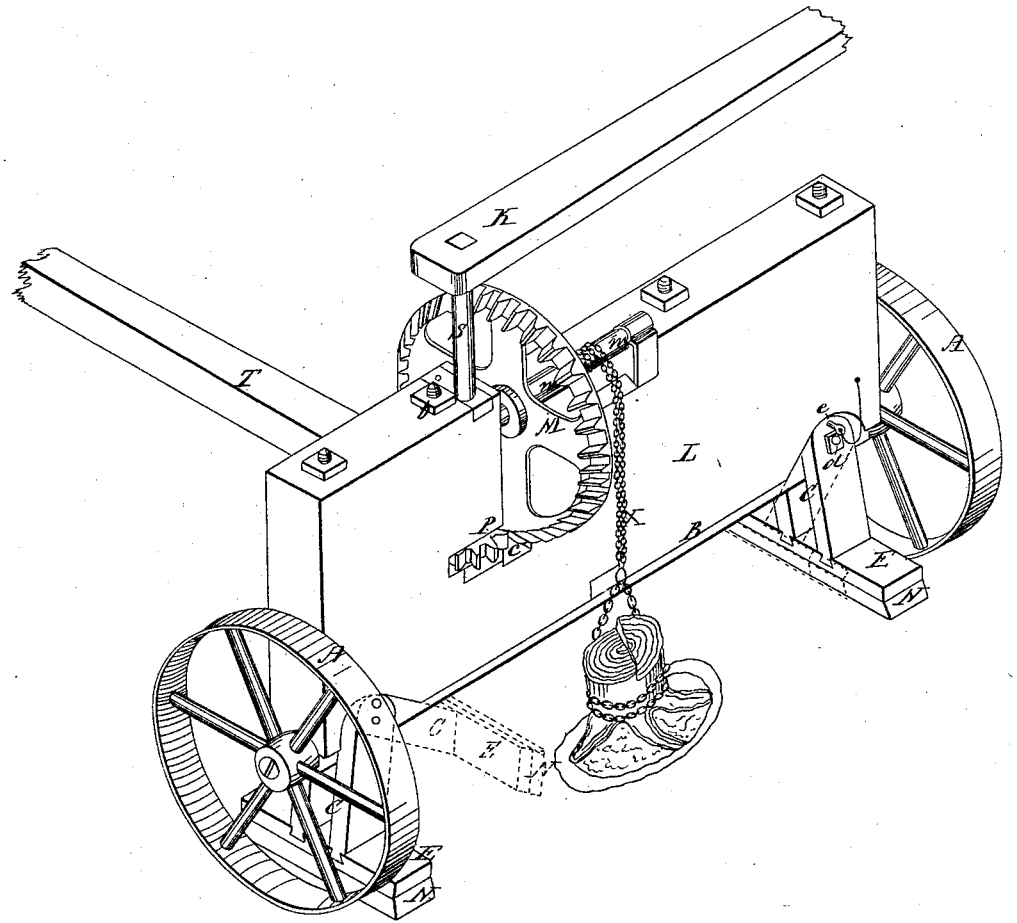
Witnesses,
Inventor:
John W. Blodgett,
by atty,

UNITED STATES PATENT OFFICE.

JOHN W. BLODGETT, OF PLYMOUTH, INDIANA.

IMPROVEMENT IN STUMP-EXTRACTORS.

Specification forming part of Letters Patent No. 55,809, dated June 26, 1866.

*To all whom it may concern:*

Be it known that I, JOHN W. BLODGETT, of Plymouth, Marshall county, State of Indiana, have invented a new and useful Stump-Extractor; and I do hereby declare that the following is a full and exact description thereof, reference being had to the accompanying drawing, forming a part of this specification, and to the letters of reference thereon marked.

The drawing is a perspective view, showing the machine in the act of pulling a stump.

The construction of my invention is so simple that a mere specification of its several parts and their usual proportions will render any competent builder of stump-extractors to make and use mine.

I first provide a pair of very strong wheels with extra-broad tires. A A are the wheels; B, the axle, which should be about nine feet between the wheels, and made of best oak or hickory, and should be about five inches thick and twelve inches wide. The wheels A should be about six feet high, very strong, and with fellies about three inches thick and four inches wide.

L is the solid part of the frame, which is about five inches, and is built upon the axle so as to strengthen it, and is about the length of the axle.

C C are two pairs of steadying-posts, each about six inches wide and four inches thick, and pivoted by very heavy bolts *a* to the lower portion of the frame and axle, and extend downward near the wheels and within about eight inches of the ground.

E E are the two bottom boards, each about three feet long, fourteen inches wide, and three inches thick, and mortised as a foot to a pair of posts, C.

N N are two extra foot-boards, to be carried about with the machine and placed on the ground under the boards E E.

There are two sets of bolts passing through posts C and frame L. When the machine is being drawn along the upper bolts, *e*, are withdrawn, so that the posts can be swung inward to clear the ground.

M is the master bevel-wheel, made of the best cast-iron, and about three feet in diameter, and very strong. Its shaft *m* should be of wrought-iron, about three inches in diameter, and turning in very strong journal-boxes secured upon the top of the frame L, near its center.

P is the pinion-wheel, about nine inches in diameter, and engaging with the master-wheel M. This pinion-wheel has a shaft of wrought-iron about two and a half inches in diameter, and has a suitable step-bearing, *c*, and journals at *b*. This shaft S extends up some inches above the upper edge of the wheel M, and is provided with a square head for receiving the mortise in the operating-lever K. The lever K should be about fourteen feet long and strong enough to withstand a one-horse-power strain.

The shaft *m* is enlarged to four or six inches diameter for a part of its center, so as to form the windlass W.

X is the chain, which should be three-quarter English cable, secured by a pin to the windlass, and used double.

T is the tongue by which the machine is moved, and it should be about twelve feet long and strong enough for a yoke of oxen.

*How to pull a stump.*—Hitch the oxen to the tongue and haul the machine to the stump, and, if the stump be not too high, put the center of the axle over the stump and fasten the chain tightly to the stump. Then place the extra foot-boards N upon the ground under the foot-boards E and turn the lever until the foot-boards E are pressed down solidly upon the extra foot-boards N. Then remove the team from the tongue. The team of oxen, or a horse, is then hitched to the end of the lever K, so as to press the wheels and foot-boards in the ground, steadying the machine and pulling the stump. The team can then be rehitched and the stump be hauled away.

If the stump is too high for the machine to straddle it, the frame L can be backed close up to it and operate as above.

I have thus described a cheap, strong, and effective device for pulling and carrying away stumps, large stones, &c.

Having thus fully described my invention, what I claim as new, and desire to secure by Letters Patent, is—

1. The combination and arrangement of the posts C and foot-boards E and N, substantially as and for the purposes set forth.

2. Wheels M and P, frame L, windlass W, chain L, and lever K, in combination with wheels A and foot-boards C E N, substantially as and for the purposes set forth.

In testimony that I claim the above I have hereunto set my hand.

JOHN W. BLODGETT.

Witnesses:
A. C. CAPRON,
MORRIS BLODGETT.